United States Patent [19]

Gjertsen et al.

[11] Patent Number: 4,687,630
[45] Date of Patent: Aug. 18, 1987

[54] TOP NOZZLE AND GUIDE THIMBLE JOINT STRUCTURE IN A NUCLEAR FUEL ASSEMBLY

[75] Inventors: Robert K. Gjertsen, Monroeville Boro; John F. Wilson, Murrysville, both of Pa.

[73] Assignee: Westinghouse Electric Corp., Pittsburgh, Pa.

[21] Appl. No.: 711,433

[22] Filed: Mar. 13, 1985

[51] Int. Cl.⁴ .............................................. G21C 3/32
[52] U.S. Cl. .................................. 376/446; 376/364; 376/449
[58] Field of Search ............... 376/446, 449, 445, 440, 376/353, 363, 364

[56] References Cited

U.S. PATENT DOCUMENTS

| | | | |
|---|---|---|---|
| Re. 31,583 | 5/1984 | Klumb et al. | 376/449 X |
| 3,770,583 | 11/1973 | Klumb et al. | 376/449 |
| 3,814,667 | 6/1974 | Klumb et al. | 376/364 |
| 3,971,575 | 7/1976 | Lesham et al. | 376/364 X |
| 4,269,661 | 5/1981 | Kmonk et al. | 376/352 |
| 4,304,631 | 12/1981 | Walton et al. | 376/364 X |
| 4,381,284 | 4/1983 | Gjertsen | 376/446 X |
| 4,534,933 | 8/1985 | Gjertsen et al. | 376/364 |
| 4,563,328 | 1/1986 | Steinke | 376/353 X |

Primary Examiner—John F. Terapane
Assistant Examiner—John S. Maples

[57] ABSTRACT

The hold-down plate of the top nozzle of a fuel assembly is interconnected to the upper extension members of the fuel assembly guide thimbles by an improved joint structure associated with each of a plurality of passageways through the hold-down plate which receives an upper end portion of each one of the guide thimble upper extension members. The improved joint structure includes an internal annular ledge on the hold-down plate within the passageway at a lower portion thereof so as to surround the upper end portion of the extension member, an annular recess on the upper end portion of the extension member, and an annular spring member fitted on the upper end portion of the extension member within the recess. The internal ledge and spring member interfere with one another so as to limit upward movement of the hold-down plate along the guide thimble extension member, while the spring member is resiliently yieldably for absorbing the energy of an impulse load applied to the hold-down plate so as to thereby limit transfer of the load to the guide thimble extension member.

10 Claims, 5 Drawing Figures

TOP NOZZLE AND GUIDE THIMBLE JOINT STRUCTURE IN A NUCLEAR FUEL ASSEMBLY

CROSS REFERENCE TO RELATED APPLICATION

Reference is hereby made to the following copending applications dealing with related subject matter and assigned to the assignee of the present invention:

1. "Nuclear Reactor Fuel Assembly With Improved Top Nozzle And Hold-Down Means" by Robert K. Gjertsen et al, assigned U.S. Ser. No. 542,625 and filed Oct. 17, 1983, now U.S. Pat. No. 4,534,933, issued Aug. 13, 1985.

2. "Reconstitutable Nuclear Reactor Fuel Assembly With Unitary Removable Top Nozzle Subassembly" by John M. Shallenberger, assigned U.S. Ser. No. 673,681 and filed Nov. 20, 1984, a continuation-in-part of U.S. application Ser. No. 457,790, filed Jan. 13, 1983.

BACKGROUND OF THE INVENTION

1. Field of the Invention

The present invention relates generally to fuel assemblies for nuclear reactors and, more particularly, is concerned with a top nozzle incorporating improvements which limit the handling loads that can be imposed on the fuel assembly especially when it is being loaded into or removed from the reactor core.

2. Description of the Prior Art

Conventional designs of fuel assemblies include a multiplicity of fuel rods held in an organized array by grids spaced along the fuel assembly length. The grids are attached to a plurality of control rod guide thimbles. Top and bottom nozzles on opposite ends of the fuel assembly are secured to the control rod guide thimbles which extend above and below the opposite ends of the fuel rods. At the top end of the fuel assembly, the guide thimbles are attached in openings provided in the top nozzle. Conventional fuel assemblies also have employed a fuel assembly hold-down device to prevent the force of the upward coolant flow from lifting a fuel assembly into damaging contact with the upper core support plate of the reactor, while allowing for changes in fuel assembly length due to core induced thermal expansion and the like. Such hold-down devices have included the use of springs surrounding the guide thimbles, such as seen in U.S. Pat. Nos. 3,770,583 (No. Re. 31,583) and 3,814,667 to Klumb et al and U.S. Pat. No. 4,269,661 to Kmonk et al.

Due to occasional failure of some fuel rods during normal reactor operation and in view of the high costs associated with replacing fuel assemblies containing failed fuel rods, the trend is currently toward making fuel assemblies reconstitutable in order to minimize operating and maintenance expenses. Conventional reconstitutable fuel assemblies incorporate design features arranged to permit the removal and replacement of individual failed fuel rods. Reconstitution has been made possible by providing a fuel assembly with a removable top nozzle. The top nozzle is mechanically fastened usually by a threaded arrangement to the upper end of each control rod uide thimble, and the top nozzle can be removed remotely from an irradiated fuel assembly while it is still submerged in a neutron-absorbing liquid. Once removal and replacement of the failed fuel rods have been carried out on the irradiated fuel assembly submerged at a work station and after the top nozzle has been remounted on the guide thimbles of the fuel assembly, the reconstituted assembly can then be reinserted into the reactor core and used until the end of its useful life.

One type of such reconstitutable fuel assembly can be seen in the aforementioned Klumb et al patents. The fuel assembly of Klumb et al includes a top nozzle which incorporates a hold-down plate and also coil springs coaxially disposed about upwardly extending alignment posts. The alignment posts extend through an upper end or adapter plate, spaced below the hold-down plate, and are joined thereto and to the upper ends of the guide thimbles with fastener nuts located on the underside of the adapter plate. The upper hold-down plate is slidably mounted on the alignment posts and the coil springs are interposed, in compression, between the hold-down plate and the adapter plate. A radially enlarged shoulder on the upper end of each of the alignment posts reacts with a shoulder on the hold-down plate to retain the hold-down plate on the posts.

When the fuel assembly is free standing after being removed from the reactor core, the hold-down plate is held at its uppermost position along the alignment posts by the coil springs. Further upward sliding movement of the hold-down plate is prevented by contact of the plate with the enlarged shoulders on the upper ends of the alignment posts. On the other hand, when the fuel assembly is positioned in the reactor core, the hold-down plate is pressed downward by the upper core plate of the reactor core. Thus, during reactor service, the hold-down plate slidably moves downward away from its freestanding position.

Transfer of the fuel assembly between its service position in the reactor core and a location outside of the core, such as a work station for reconstitution of the fuel assembly, is accomplished by use of a conventional fuel assembly handling machine. For handling the fuel assembly, a gripper of the machine is brought into engagement with the hold-down plate and then moved in an upward direction so as to lift the fuel assembly via its top nozzle. While the gripper so supports the fuel assembly, the load passes from the gripper to the hold-down plate and therefrom to the guide thimbles via the alignment posts in view that the connection between the hold-down plate and the guide thimbles is, in effect, substantially unyielding or rigid.

The above-described type of connection of the hold-down plate with the guide thimble alignment posts in the reconstitutable fuel assembly of the Klumb et al patents imposes on the design of the fuel assembly structure the requirement that it be capable of withstanding large lifting loads, typically on the order of 6 g. These high loads are impulse type loads which are of very short duration. (The fuel assembly handling machine has a load limiting system to prevent sustained high loads on the fuel assembly.) The postulated 6 g axial load can occur when the fuel assembly is being lowered adjacent to another assembly, and it momentarily hangs up on the stationary assembly. For example, the grids interlock or the bottom nozzle of the fuel assembly being lowered catches on the top nozzle of the stationary assembly. The fuel assembly being lowered then breaks loose from its hangup and drops downwardly until it is stopped by the fuel assembly handling machine which has continued downward. The impact energy caused by this sudden drop is now absorbed by the fuel assembly structure. (The fuel handling machine is assumed to be rigid.)

Although the above-described event occurs very infrequently, the fuel assembly structure must be designed to withstand these high loads. Unfortunately, the occurrence of these high loads, however infrequent, reduces the overall reliability of the fuel assembly structure and increases the complexity of the design of the top nozzle and guide thimble connections in the fuel assembly. Consequently, a need exists for a fresh approach to fuel assembly top nozzle design with the objective of reducing the loads on the top nozzle and guide thimble joints and thereby increasing fuel assembly reliability.

SUMMARY OF THE INVENTIO

The present invention provides an improved top nozzle and guide thimble joint structure designed to satisfy the aforementioned needs. Underlying the present invention is a recognition that the problem with the prior art fuel assembly is the rigid connection between the top nozzle hold-down plate and the fuel assembly guide thimble when the fuel assembly is in its freestanding position, such as when it is supported by the fuel assembly handling machine. If an energy absorbing means could be interposed between the fuel assembly handling machine gripper and the fuel assembly structure, the design loads for the fuel assembly could be reduced. The improved joint structure of the present invention provides a flexible connection of the hold-down plate to the guide thimble alignment posts which serves as an energy absorber. Provision of the flexible, or yieldable, joint structure reduces the loads on the top nozzle and guide thimble joints and, as a result, increases fuel assembly reliability. More importantly, it simplifies the design of the fuel assembly top nozzle and guide thimble connections.

Accordingly, the present invention is provided in a nuclear fuel assembly having at least one control rod guide thimble and a top nozzle, wherein the guide thimble includes an upper extension member and the top nozzle includes an upper hold-down plate having a passageway slidably receiving an upper end portion of the extension member. The present invention is directed to an improved joint structure flexibly interconnecting the hold-down plate with the upper end portion of the guide thimble upper extension member. The improved joint structure basically comprises: (a) first overlapping means on the upper hold-down plate at the passageway thereof; and (b) second overlapping means on the upper end portion of the guide thimble extension member. The first and second overlapping means are respectively disposed to interfere with one another so as to limit upward movement of the hold-down plate along the guide thimble extension member. At least one of the first and second overlapping means is resiliently yieldable for absorbing the energy of an impulse load applied to the hold-down plate so as to thereby limit transfer of the load to the guide thimble extension member.

More particularly, the first overlapping means is an internal ledge defined on the hold-down plate within its passageway, being preferably located in a lower portion of the passageway. The second overlapping means includes a recess defined on the upper end portion of the guide thimble extension member, and a spring member fitted on the upper end portions within the recess thereon and extending outwardly therefrom so as to overlie the internal ledge in the hold-down plate passageway.

Still further, the recess is defined between a lower upwardly-facing shoulder on the upper end portion of the guide thimble extension member and an upper detachable member releasably applied to the upper end portion of the extension member. The spring member is at least one belleville spring which deflects axially upon application of a large impulse load thereto via the internal ledge of the hold-down plate.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
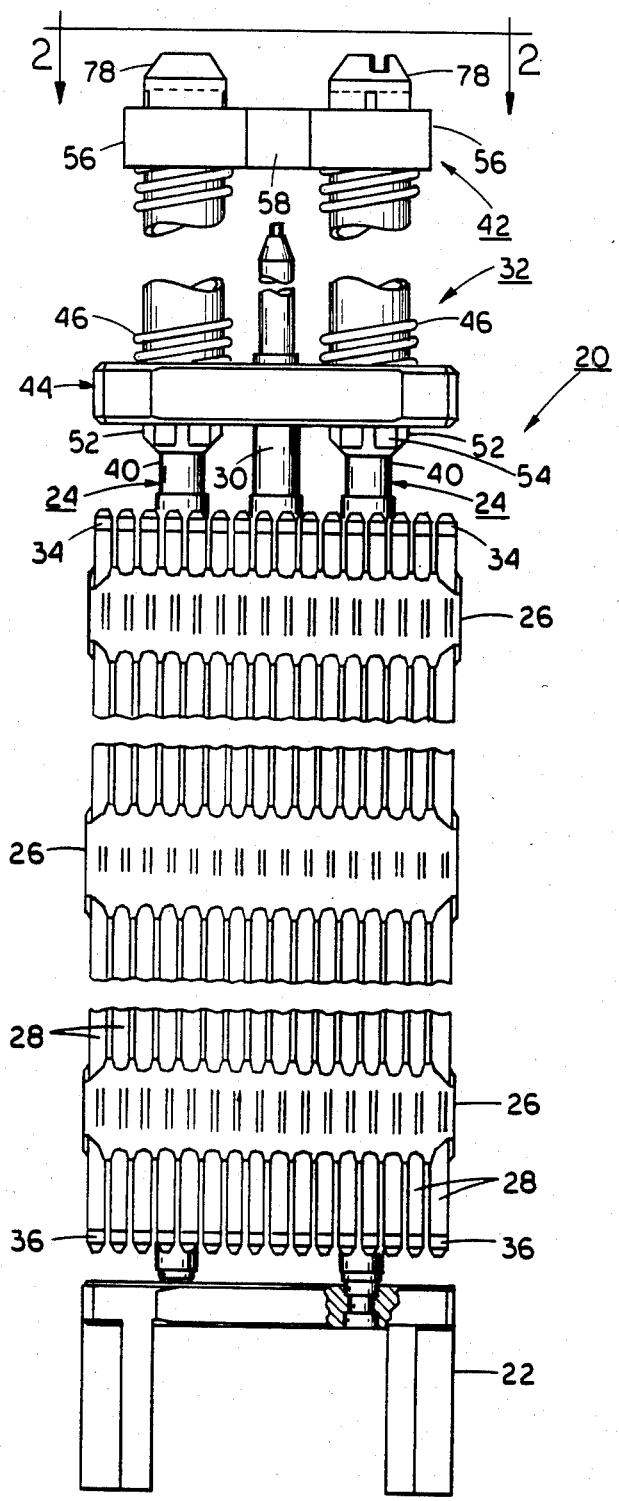
FIG. 1 is an elevational view, with parts broken away for clarity, of a fuel assembly having an improved top nozzle and guide thimble joint structure constructed in accordance with the principles of the present invention.

In the following description, like reference characters designate like or corresponding parts throughout the several views of the drawings. Also, in the following description, it is to be understood that such terms as "forward", "rearward", "left", "right", "upwardly", "downwardly", and the like are words of convenience and are not to be construed as limiting terms.

In General

Referring now the drawings, and particularly to FIG. 1, there is shown an elevational view of a reconstitutable nuclear reactor fuel assembly, represented in vertically foreshortened form and being generally designated by the numeral 20. Basically, the fuel assembly 20 includes a lower end structure or bottom nozzle 22 for supporting the assembly on the lower core plate (not shown) in the core region of a reactor (not shown), and a number of longitudinally extending guide tubes or thimbles 24 which project upwardly from the bottom nozzle 22. The assembly 20 further includes a plurality of transverse grids 26 axially spaced along the guide thimbles 24 and an organized array of elongated fuel rods 28 transversely spaced and supported by the grids 26. Also, the assembly 20 has an instrumentation tube 30 located in the center thereof and an upper end structure or top nozzle 32 attached to the upper ends of the guide thimbles 24 which incorporates certain improvements in accordance with the present invention which will be fully described below. With such an arrangement of parts, the fuel assembly 20 forms an integral unit capable of being conventionally handled without damaging the assembly parts.

As mentioned above, the fuel rods 28 in the array thereof in the assembly 20 are held in spaced relationship with one another by the grids 26 spaced along the fuel assembly length. Each fuel rod 28 includes nuclear fuel pellets (not shown) and is closed at its opposite ends by upper and lower end plugs 34,36. The fuel pellets composed of fissile material are responsible for creating the reactive power of the reactor. A liquid moderator/coolant such as water, or water containing boron, is pumped upwardly through the guide thimbles 24 and along the fuel rods 28 of the fuel assembly 20 in order to extract heat generated therein for the production of useful work.

To control the fission process, a number of control rods (not shown) are reciprocally movable in the guide thimbles 24 located at predetermined positions in the fuel assembly 20. Since, the control rods are inserted into the guide thimbles 24 from the top of the fuel assembly 20, the placement of the components forming the improved joint structure interconnecting the top nozzle 32 and the guide thimbles 24 must accommodate the movement of the control rods into the guide thimbles from above the top nozzle.

Improved Top Nozzle and Guide Thimble Joint Structure

Figure 2:
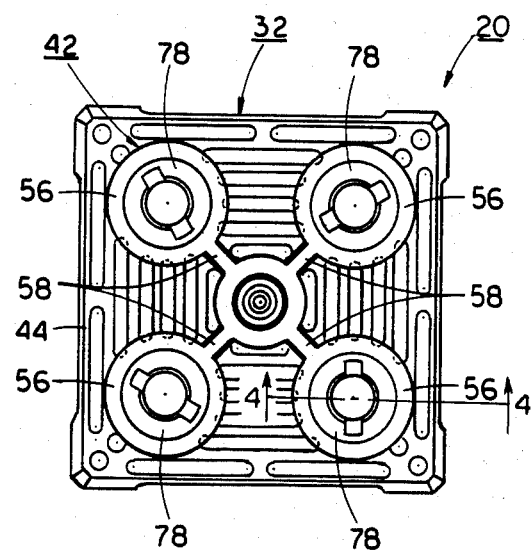
FIG. 2 is a top plan view of the fuel assembly as seen along line 2—2 of FIG. 1.
Figure 3:
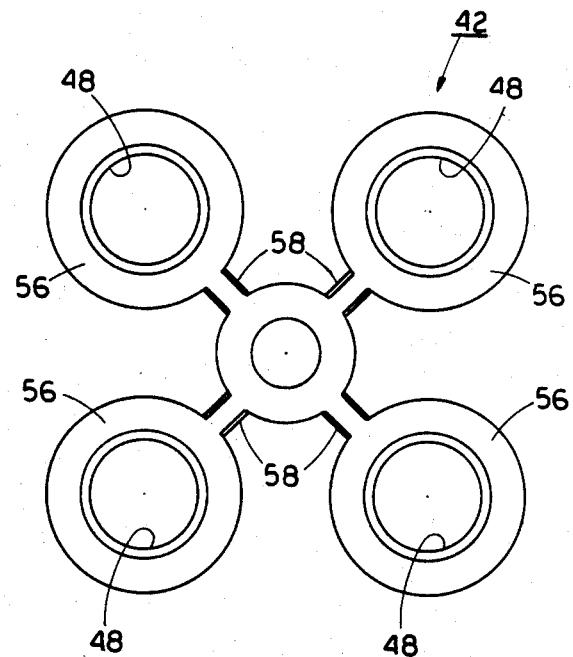
FIG. 3 is an enlarged top plan view of a hold-down plate removed from the top nozzle of the fuel assembly of FIGS. 1 and 2.
Figure 4:
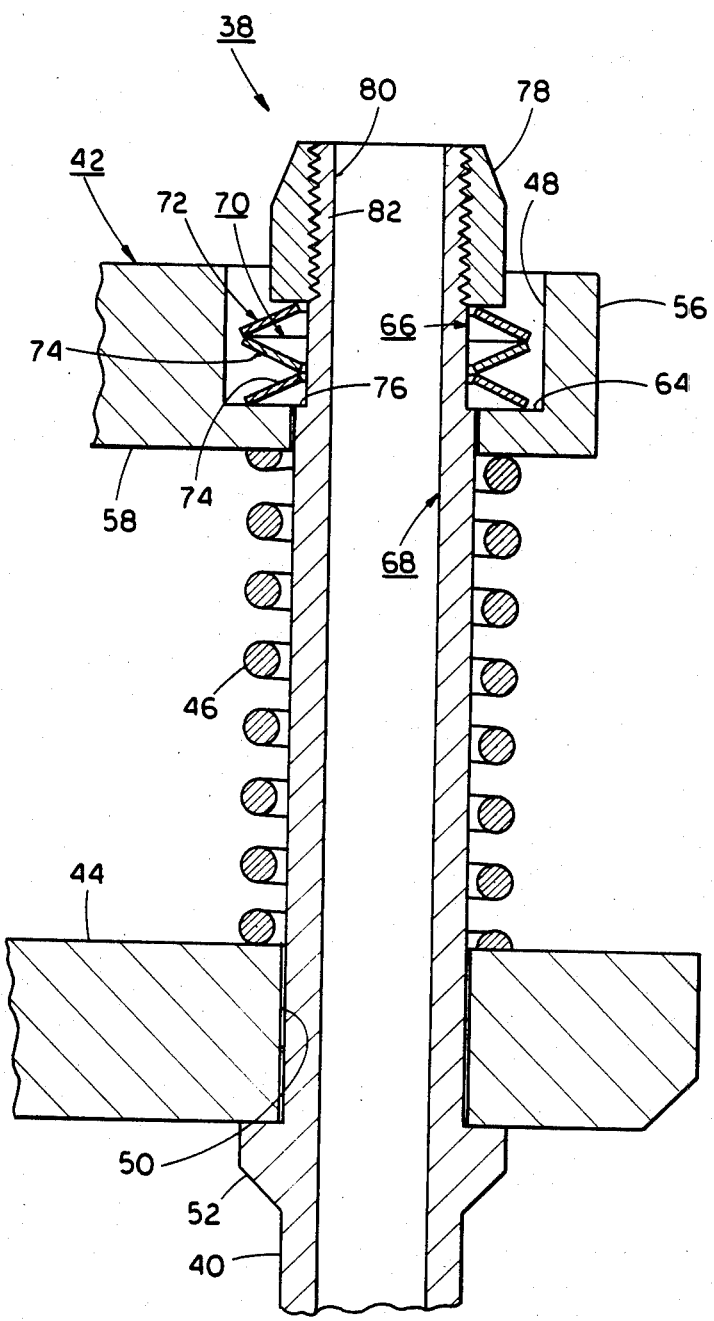
FIG. 4 is an enlarged fragmentary sectional view of the top nozzle of the fuel assembly as taken along line 4—4 of FIG. 2.

Turning now to FIGS. 1 to 4, there is shown in FIG. 4 a preferred embodiment of the improved joint structure of the present invention, generally designated 38, which flexibly interconnects the top nozzle 32 with the guide thimbles 24. The top nozzle 32, which is mounted to upper hollow tubular extension members 40 of the respective guide thimbles 24. includes an upper hold-down plate 42, a lower adapter plate 44, and a plurality of hold-down coil springs 46 disposed between the upper and lower plates 42,44. The upper hold-down plate 42 has a plurality of passageways 48 defined therethrough, while the lower adapter plate 44 has a plurality of openings 50, the passageways 48 and openings 50 being arranged in respective patterns which are matched to that of the guide thimbles 24 of the fuel assembly 20.

More particularly, the upper tubular extension members 40 of the guide thimbles 24 extend upwardly and are slidably inserted through the respective openings 50 in the lower adapter plate 44 and the respective passageways 48 in the upper hold-down plate 42. The hold-down springs 46 are inserted about the respective extension members 40 and displace the upper hold-down plate 42 above the lower adapter plate 44. A plurality of lower retainers 52 are attached, such as by brazing, to the guide thimble extension members 40 below the lower adapter plate 44 for limiting downward slidable movement of the adapter plate 44 relative to the guide thimbles 24 and thereby supporting the adapter plate at a stationary position along the guide thimbles. Each lower retainer 52 on one guide thimble 24 has a series of scallops 54 formed on its periphery which are aligned with those of the fuel rods 28 grouped about the respective one guide thimble 24 so that the fuel rods may be removed and replaced during reconstitution of the fuel assembly 20.

As seen particularly in FIGS. 2 and 3, the upper hold-down plate 42 is composed of an array of hubs 56 and radially-arranged spokes or ligaments 58 which extend between and interconnect the hubs. Each of the hubs 56 has one of the passageways 48 defined therethrough.

Figure 5:
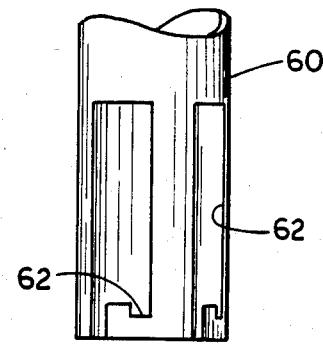
FIG. 5 is a fragmentary side elevational view of the gripper of the conventional fuel assembly handling machine.

For transfer of the fuel assembly 20 to and from the reactor core, a fuel assembly handling machine (not shown) having a gripper 60, such as seen in FIG. 5, is utilized. The gripper 60 is a cylinder with four inverted J-slots 62 cut in it. The gripper 60 is applied on the four ligaments 58 of the hold-down plate 42 by lowering it so that the ligaments fit through the slots 62 and then it is rotated about its axis to lock the ligaments in place through the slots. When the gripper is raised upwardly, it lifts the upper hold-down plate 42 with it. In the past, the lifting load passed from the gripper to the hold-down plate 42 and therefrom to the guide thimbles 24 via the upper extension members 40 due to rigid or inflexible contact established between the hold-down plate 42 and the guide thimble extensions members 40 at the upper limit of slidable movement of the hold-down plate along the guide thimbles. Consequently, the energy of high impulse loads which occasionally occurred as the fuel assembly 20 was being lifted from or lowered into the reactor core also propagated directly to the guide thimbles of the fuel assembly. However, now in view of the provision of the improved joint structure 38 between the upper hold-down plate 42 of the top nozzle 32 and the upper extension members 40 of the guide thimbles 24, an effective energy absorbing means is interposed between the fuel assembly handling machine gripper 60 and the guide thimbles 24 of the fuel assembly structure which substantially prevents transfer of the impulsive, impact energy.

As seen in FIG. 4, the improved joint structure 38 includes first overlapping means in the form of an internal annular ledge 64 defined on each hub 56 of the upper hold-down plate 42 in a lower portion of the passageway 48 thereof so as to surround the extension member 40, and second overlapping means, generally designated 66, on an upper end portion 68 of each guide thimble upper extension member 40 which is disposed through the passageway 48 of the hold-down plate 42. The second overlapping means 66 includes an annular recess 70 defined on the upper end portion 68 of the extension member 40, and an annular spring member 72 fitted on the upper end portion 68 within the recess 70. The spring member 72 extends outwardly beyond the outside diameter of the extension member 40 so as to overlie the internal ledge 64 in the hold-down plate passageway 48. With such arrangement, the ledge 64 of the first overlapping means and the spring member 72 of the second overlapping means are disposed to interfere with one another so as to limit upward movement of the hold-down plate 42 along the guide thimble extension member 40.

However, while the inside diameter of the passageway 48 at the ledge 64 is less than the outside diameter of the spring member 72, the inside diameter of the passageway over the ledge is greater than the outside diameter of the spring member. Therefore, there is no interference between the first and second overlapping means which would limit movement of the hold-down plate 42 downwardly along the guide thimble upper extension member 40 during its performance of the hold-down function when the fuel assembly 20 is disposed within the reactor core.

In the preferred embodiment of FIG. 4, the spring member 72 takes the form of a stack of several belleville springs 74. The belleville springs 74 can deflect axially upon application of a large impulse load thereto. The springs 74 cooperate with the internal ledge 64 to provide a flexible connection between the hold-down plate 42 and guide thimble extension members 40. The springs 74 are resiliently yieldable so as to bias the hold-down plate 42 toward the lower adapter plate 44 and against the bias of the hold-down springs 46. The springs 74 thus serve as an energy absorber having a simple and reliable construction for absorbing the energy of an impulse load applied to the hold-down plate in the direction upwardly along the guide thimble extension member so as to thereby limit transfer of the load to the extension member. Under normal lifting for lowering loads, the springs 74 are only slightly deflected. If a large impulse load is applied, the springs 74 will then deflect greater and thus absorb the energy and limit its transfer from the hold-down plate 42 to the guide thimbles 24 via the extension members 40.

The recess 70 is defined between a lower upwardly-facing annular shoulder 76 on the upper end portion 68 of the guide thimble extension member 40, and an upper detachable member in the form of a retainer nut 78 releasably threaded to the externally-threaded terminal end 80 of the extension member upper end portion 68. The shoulder 76 is defined by an upper annular section 82 which contains the terminal end 80 and has an outside diameter reduced from that of the remainder of the extension member upper end portion 68. Thus, the belleville springs 74 are held in place against downward movement by the shoulder 76 on the extension member 40 and against upward movement by the retainer nut 78. It is further readily seen that the top nozzle 32 including the flexible joint structure 38 can be disassembled by removing the each retainer nut 78 from the terminal end 80 of the each extension member 40.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In a nuclear fuel assembly having at least one control rod guide thimble and a top nozzle, said guide thimble including an upper extension member, said top nozzle including a lower adapter plate supported on said guide thimble with said extension member extending above said lower adapter plate, an upper hold-down plate having a passageway slidably receiving an upper end portion of said extension member and at least one hold-down spring disposed between said plates so as to bias said upper hold-down plate for movement upwardly along said extension member in a direction away from said lower adapter plate, an improved joint structure flexibly interconnecting said hold-down plate with said upper end portion of said guide thimble upper extension member, said joint structure comprising:
    (a) first overlapping means on said upper hold-down plate at side passageway thereof; and
    (b) second overlapping means on said upper end portion of said guide thimble extension member;
    (c) said first and second overlapping means being respectively disposed to interfere with one another so as to limit said upward movement of said hold-down plate along said guide thimble extension member in the direction away from said lower adapter plate;
    (d) at least one of said first and second overlapping means being resiliently yieldable so as to bias said hold-down plate in an opposite direction toward said lower adapter plate and against the bias of said hold-down spring for absorbing the energy of an impulse load applied to said hold-down plate in the direction upwardly along said guide thimble extension member so as to thereby limit transfer of said load to said guide thimble extension member.

2. The improved joint structure as recited in claim 1, wherein said first overlapping means is an internal ledge defined on said hold-down plate within said passageway thereof so as to surround said upper end portion of said extension member.

3. The improved joint structure as recited in claim 2, wherein said internal ledge is located in a lower portion of said passageway.

4. The improved joint structure as recited in claim 2, wherein said second overlapping means includes:
    a recess defined on said upper end portion of said guide thimble extension member; and
    a spring member fitted on said upper end portion within said recess thereon and extending outwardly therefrom so as to overlie said internal ledge in said hold-down plate passageway.

5. The improved joint structure as recited in claim 4, wherein said spring member is at least one belleville spring which deflects axially upon application of a large impulse load thereto via said internal ledge of said hold-down plate.

6. The improved joint structure as recited in claim 4, wherein said recess is defined between a lower upwardly-facing shoulder on said upper end portion of said guide thimble extension member and an upper detachable member releasably applied to said upper end portion of said extension member.

7. In a nuclear fuel assembly having at least one control rod guide thimble and a top nozzle, said guide thimble including an upper tubular extension member, said top nozzle including a lower adapter plate supported on said guide thimble with said extension member extending above said lower adapter plate, an upper hold-down plate having a passageway slidably receiving an upper end portion of said guide thimble extension member and at least one hold-down spring disposed between said plates so as to bias said upper hold-down plate for movement upwardly along said extension member in a direction away from said lower adapter plate, an improved joint structure flexibly interconnecting said hold-down plate with said upper end portion of said guide thimble upper extension member, said joint structure comprising:
    (a) an internal annular ledge defined on said upper hold-down plate within said passageway at a lower portion thereof so as to surround said upper end portion of said extension member;
    (b) means defining an annular recess on said upper end portion of said guide thimble extension member; and
    (c) an annular spring member fitted on said upper end portion within said annular recess therein, said spring member having an outside diameter greater than an inside diameter of said internal ledge but less than an inside diameter of the remainder of said passageway above said ledge such that said spring member extends outwardly from said recess so as to overlie said internal ledge and thereby interfere therewith to limit said upward movement of said upper hold-down plate in the direction away from said lower adapter plate along said guide thimble extension member but not limit downward movement of said upper hold-down plate in the opposite direction toward said lower adapter plate, said spring member being resiliently yieldable so as to bias said hold-down plate in an opposite direction toward said lower adapter plate and against the bias of said hold-down spring for absorbing the energy of an impulse load applied to said hold-down plate in the direction upwardly along said guide thimble extension member so as to thereby limit transfer of said load to said guide thimble extension member.

8. The improved joint structure as recited in claim 7, wherein said spring member is in the form of a stack of belleville springs which deflect axially upon application of a large impulse load thereto via said internal ledge of said hold-down plate.

9. The improved joint structure as recited in claim 7, wherein said means defining said recess includes:
- a lower upwardly-facing shoulder on said upper end portion of said guide thimble extension member; and
- an upper detachable member releasably applied to said upper end portion of said extension member.

10. The improved joint structure as recited in claim 9, wherein said detachable member is a retainer nut threadably attached to a terminal end of said upper end portion of said extension member such that when said nut is removed from said extension member, said top nozzle spring member can be disassembled from said guide thimble extension member.

* * * * *